United States Patent [19]

Chao

[11] Patent Number: 4,785,048
[45] Date of Patent: Nov. 15, 1988

[54] POLYUREA AND POLYUREA-EPOXY MICROCAPSULES

[75] Inventor: Hung-Ya Chao, Erie, N.Y.

[73] Assignee: Moore Business Forms, Inc., Grand Island, N.Y.

[21] Appl. No.: 153,449

[22] Filed: Feb. 8, 1988

[51] Int. Cl.[4] ............................................. C08L 75/00
[52] U.S. Cl. .................................... 524/745; 524/747; 427/146; 427/154; 427/213.31; 427/213.32; 427/213.33; 428/321.5; 428/402
[58] Field of Search ............... 524/745, 747; 427/146, 427/154, 213.31, 213.32, 213.33; 428/321.5, 402

[56] References Cited

U.S. PATENT DOCUMENTS 2,712,507  7/1955  Green ................................. 428/499
4,680,056  7/1987  Komin ................................ 427/146

Primary Examiner—Maurice J. Welsh
Attorney, Agent, or Firm—Cushman, Darby & Cushman

[57] ABSTRACT

An improved process for the production of microcapsules by the use of hydrogen transfer polymerization in the presence of a mixture of emulsifiers including either an aqueous solution of a sodium salt of naphthalene-sulfonic acid-formaldehyde condensate or diphenyloxide disulfonate with a polyvinyl alcohol. The process is particularly useful for the production of microcapsules containing a colorless dye intermediate used in carbonless copy paper (CCP) applications.

4 Claims, No Drawings

POLYUREA AND POLYUREA-EPOXY MICROCAPSULES

BACKGROUND OF THE INVENTION

1. Field of the Invention

The present invention relates to an improved process for the production of microcapsules by use of a novel combination of emulsifiers in a solution from which the microcapsules are formed. The process is particularly useful for the production of microcapsules containing a colorless dye intermediate used in carbonless copy paper (CCP) applications.

2. Description of the Prior Art

In the broadest sense, micro-encapsulation provides a means of packaging, separating and storing materials on a microscopic scale for later release under controlled conditions. Minute particles or droplets of almost any material may be encased by a capsule wall and thus isolated from reactive or otherwise hostile surroundings. The contents of a microcapsule may be made available by mechanical rupture of the capsule wall or its disintegration by chemical means.

The encapsulated product, the core, may be a single substance or a mixture, and may be liquid or solid in nature. The core may be, in itself, the primary material to be encapsulated, or it may be a vehicle containing the desired material in solution, emulsion or dispersion form.

The most commonly used wall materials are natural or synthetic polymers. The wall material is usually inert. A tougher, less permeable capsule wall may be formed by inclusion of an isocyanate in the wall composition. The isocyanate acts as a cross-linker between chains of polymer molecules, joining certain carbon atoms of the chains by the formation of chemical bonds.

Certain micro-encapsulation procedures are based upon interfacial polymerization reactions. Procedures based upon interfacial polymerization reactions make use of an emulsion in which each of a pair of immiscible liquids has dissolved in it a complementary reactant of a polymer-forming system. When the two reactants meet at an interface, polymerization proceeds and a thin, insoluble film forms, which in turn, isolates the core material from its surrounding environment. A dispersing agent may be used to promote uniformity and maximum stability of the dispersed phase.

Hydrogen transfer polymerization is an interfacial polymerization reaction in which the molecule undergoing polymerization rearranges to an energetically preferred structure so that the repeat unit of the polymer does not possess the structure of the original molecule. More specifically, it is a polymerization that proceeds by intermolecular hydrogen migrations. The characteristic feature of compounds that undergo hydrogen transfer polymerization is their possession of a labile hydrogen atom, i.e., a hydrogen atom bonded to an electronegative atom or to an atom activated by strongly electro-negative substituents.

Following capsule wall formation, the resultant microcapsule containing slurry may be spray-dried. A spray dryer is a large, usually vertical, chamber through which a hot gas is blown, and into which a liquid, slurry, or paste may be sprayed by a suitable atomizer. The size of the spray-dried particles may range from about 2 $\mu$m to 1 mm in diameter. All drops must be dried until no longer sticky, before they strike the chamber wall. Spray dryers are particularly useful in their ability to handle certain materials due to the short contact time of the material in the dryer and in their ability to handle concentrated solutions. The viscosity of the solutions to be sprayed may be as high as 300 cP, which means that less water must be removed from concentrated solutions.

The production of carbonless copy paper, wherein a colorless dye intermediate such as, crystal violet lactone or benzoyl leuco methylene blue, is microencapsulated to form particles less than 20 $\mu$m in diameter, is a major application of micro-encapsulation processes. The microcapsules are deposited in a thin layer on the underside of a sheet of paper in contact with a second receiving sheet of paper. The top side of the receiving sheet is sensitized with an acid reactant. The microcapsules are designed to resist breakage under normal conditions of storage and handling, but to break under the high local pressure of a pen or pencil point, or a typing element. When the microcapsules break, the dye intermediate is released so that it can contact the acid and react with it, thereby producing a colored image on the receiving sheet.

The preparation of microcapsules suitable for use in carbonless copy paper applications is well known in the art. Such a system was first disclosed in U.S. Pat. No. 2,712,507, issued July 5, 1955, on the application of Barrett K. Green. Green disclosed a process wherein a small amount of crystal violet lactone was dissolved in an oily fluid and enclosed in microcapsules whose walls ruptured upon high local pressure. The microcapsules were coated in a thin layer on the underside of a sheet of paper beneath which was a second sheet of paper sensitized with an acidic reactant. The encapsulated dye intermediate, subsequently transferred by printing pressure to the receiving sheet, assumed a visually distinctive color upon reaction with the acid. This system is now used throughout the world in the application of micro-encapsulation to the production of carbonless copy paper.

Microcapsules suitable for use in the production of carbonless copy paper must meet certain requirements. The capsule walls must be impermeable to the colorless dye intermediate and to its solvent. Permeability to the colorless dye intermediate causes discoloration; permeability to the solvent causes desiccation of the capsule's contents and thus reduces the capsule's effectiveness. The capsule walls should be as impermeable as possible to oxygen, to light, and to acids and bases.

The capsule walls must be sufficiently strong to provide microcapsules which break only under the high local pressure exerted by a writing intrument; the walls must be strong enough to resist other types of pressure.

Dry free flowing capsules having less agglomeration can be produced by spray-drying the microcapsules of the present process. Certain carbonless paper products require the incorporation of these capsules in hot melt waxes, inks, or similar type vehicles for spot coating applications. Smoother coatings are easier to produce because the free-flowing capsules are easier to disperse. Breakage of the capsules during coating and handling is reduced because the capsules are better dispersed and less agglomerated.

In order to form less permeable microcapsules, it is important that the proper emulsifying agent is chosen. Additionally, the effect of the emulsifier on the subsequent spray-drying characteristics of the microcapsules so formed must also be considered. It is well-known in the art that partially hydrolyzed polyvinyl alcohol (PVA) can be used as an emulsifier for micro-encapsulation processes. It has been found however, that such microcapsules are still undesirably permeable. Further, spray-drying of microcapsules obtained using PVA as an emulsifier is difficult since agglomeration of the microcapsules occurs.

Additionally, Becher et al., U.S. Pat. No. 4,563,212, describes a micro-encapsulation procedure based upon an interfacial polymerization reaction wherein the material to be encapsulated is an agricultural chemical such as an herbicide, an insecticide, a plant growth regulator or an herbicidal antidote.

Becher et al. disclose a process wherein a water-immiscible material, containing the first shell wall component, is emulsified into an aqueous solution containing an emulsifier selected from the group consisting of sulfonated napthalene formaldehyde condensates, sulfonated polystyrenes and functionalized oligomers. In Becher et al., an oil-in-water emulsion is formed with the aid of high shear; the second shell wall component is added to the oil-in-water emulsion, and after a short period of time, the shear rate is reduced. Shear is continued for varying periods of time, following which salt is added to the suspension to balance its density. The formulation is subsequently bottled.

It is taught that the use of these emulsifiers increases the amount of active ingredient which is encapsulated from solution compared to known emulsifiers. The microcapsules disclosed by Becher et al. undergo no further treatment such as separation from the aqueous liquid, but may be directly utilized or combined with liquid fertilizers, insecticides or the like to form aqueous solutions which may be conveniently applied in agricultural uses.

Thus, the prior art has not disclosed a process for the production of microcapsules suitable for use in carbonless copy paper applications which provides capsule walls as impermeable as would be desired to the colorless dye intermediate, and as strong as would be desired to withstand pressures other than the high local pressure exerted by a writing instrument. Nor does the prior art disclose an interfacial micro-encapsulation process providing adequately free-flowing capsular powder.

SUMMARY OF THE INVENTION

Thus, the present invention is directed to a novel process for the production of microcapsule slurry suitable for use in carbonless copy paper coatings and applications which provide microcapsules with significant increases in capsule wall impermeability and strength. In addition, the microcapsules of the invention provide free-flowing capsular powder with excellent characteristics when spray-dried.

The process of the present invention forms microcapsule walls by hydrogen transfer polymerization in the presence of an aqueous mixture of partially hydrolyzed polyvinyl alcohol (PVA) and a naphthalene-sulfonic acid-formaldehyde (NSF) condensate or diphenyloxide disulfonate (DDS).

DETAILED DESCRIPTION OF THE INVENTION

According to the present invention, an oil-core material containing a dye such as a colorless dye intermediate for carbonless copy paper is mixed with a high boiling point carrier solvent and a polyisocyanate or a polyisocyanate-epoxy resin mixture. The resultant solution is dispersed into an aqueous solution of a combined sodium salt of naphthalene-sulfonic acid-formaldehyde condensate and a protecting colloid polymer to form an oil-in-water emulsion. A water-soluble polyamine is subsequently added into the emulsion. The emulsion is stirred; hydrogen transfer polymerization proceeds and polymerized polyurea or polyurea-epoxy composite walls form around the oil-core material.

If the microcapsules are to be used for carbonless copy paper in which the dye and developer are on the same surface, then the resultant microcapsule slurry is mixed with a phenolic resin slurry, following which the mixed slurry is coated on a suitable substrate. Otherwise, the microcapsules described above are coated alone.

The present invention may be also applied to the encapsulation of magnetite, carbon black, or other coloring pigments for producing toners used in copying machines and non-impact printers which utilize electrophotographic, electrographic, or magnetographic processes. Toner capsules made by the present process have improved shell integrity, less agglomeration, and reduced susceptibility to humidity.

Microcapsules prepared according to the present invention show notable increases in capsule wall impermeability and strength, over microcapsules prepared according to the conventional method as previously mentioned.

The impermeability of the microcapsules may be determined by quantitative measurement according to the following procedure.

A slurry containing a mixture of microencapsulated carbonless color precursor and novolac phenolic resin color developer is coated on a paper substrate. The coated sheet at the specified coating weight is placed in an oven at 150° C. for a period of 15 minutes. The degree of discoloration is measured by a conventional image intensity instrument such as the BNL-2 Opacimeter. A higher reflectance reading indicates a more impermeable capsule.

Less permeable and less agglomerated capsules are obtained when an aqueous solution of a mixture of suitable proportions of a low molecular weight NSF or DDS and a protective colloid such as partially hydrolyzed PVA is utilized as an emulsifying agent. When formulating the mixture, the PVA is present in minor proportions to the NSF or DDS. Unsatisfactory porous-walled capsules were obtained when the mixture contained major amounts of the protective colloid, or if only a protective colloid was used as an emulsifying agent. While the reason for this is not completely understood, it is believed that reaction occurs between the isocyanate molecule in the oil phase and the partially hydrolyzed PVA molecule in the aqueous phase which reduces the overall crosslinking density of the capsules. It is to be understood that capsule walls are formed mainly by the reaction of the isocynate or the isocyanate-epoxy composite in the oil phase and the polyamine in the aqueous phase at the interface. On the other hand, it has been found that using NSF or DDS alone, as an emulsifier, also produced unsatisfactory results because agglomeration or excess amount of free unencapsulated oil occurred during encapsulation.

Spray-drying the microcapsule slurry prepared using PVA or a large proportion of PVA as an emulsifying agent or a binder produces a powder containing substantial amounts of agglomerate having inferior dry free-flowing characteristics and increased susceptibility to humidity. Many of these problems are eliminated by the present process. In addition, the time-consuming and expensive process of repeated washings, separations, and decantings of the capsules to remove the PVA before spray-drying is elminated.

The best capsules are obtained when a mixture containing a minor proportion of a protective colloid emulsifying agent, such as partially hydrolyzed PVA and a major proportion of low molecular weight DDS or NSF emulsifying agent is used. The resulting capsule slurry has substantially reduced agglomeration and, unencapsulated solvent and precursor material is reduced also. Additionally, the microcapsules are more impermeable, which provides carbonless coatings of improved stability and reduced discoloration.

As mentioned above, in the present invention an oil-core material containing a colorless dye intermediate and a high boiling point carrier solvent, such as an alkylnaphthalene, is mixed with a polyisocyanate or a polyisocyanate-epoxy resin mixture.

Suitable polyisocyanates include polymethylene polyphenyl isocyanates, polyisocyanate prepolymers, polyisocyanate-polyol adducts, polyfunctional aliphatic isocyanates, e.g. Desmodur L-2291A from Mobay Chemicals, p,p'-diphenylmethane diisocyanate (MDI), modified MDI's such as Mondur xp-744 from Mobay Chemicals, and Isonate 143L from Upjohn Polymer Chemicals, dicyclohexylmethane-4,4'-diisocyanate, and the like.

Epoxy resins suitable for use in the present invention include bisphenol A-based liquid epoxy resins with equivalent weight in the ranges of 175-210 such as Ciba-Geigy Araldite 6005, 6010,6020, Shell Epon 828, Reichhold Epotuf 37-139, 37-140, and the like.

The resultant solution is dispersed into an aqueous solution containing the emulsifier mixture of the invention. As the DDS component, Dowfax 2A1, 3B2 or XDS 8292.00 (all from Dow Chemical) may be used. When NSF is used in the emulsifying mixture, Tamol L and Tamol SN (both from Rohm and Haas) may be used. As the protective colloid component, a number of products are useful including Vinol 540, 523, 205 (polyvinyl alcohol from Air Products and Chemicals), styrene/maleic anhydride copolymers (e.g. Scripset 520 or 540 from Monsanto), PVP which is poly(vinylpyrrolidone), PSS which is poly(styrene-sulfonate), gelatins, polyacrylic acid, acrylic acid copolymers such as poly(acrylamideacrylic acid sodium salt) designated PAAS, ethylene/maleic anhydride copolymer (e.g. EMA 31 from Monsanto), poly(vinylmethylether/-maleic acid) (e.g. Gantrez 119 from GAF), and others.

A water-soluble polyamine is subsequently added into the oil-in-water emulsion. Illustrative of polyamines which may be used are ethylenediamine (ED), 1,4-diaminobutane, hexamethylene-diamine (HMD), 1,8-diaminooctane, 1,10-diaminodecane, bis hexamethylenetriamine, diethylenetriamine (DETA), dipropylenetriamine, triethylenetetramine, tetraethylene pentamine, polyethyleneimines, polyoxyalkylene amines and like compounds. During the polyamine addition, the emulsion preferably is heated to a range of 25° C. to 70° C. for a period of 1 to 24 hours.

Generally, capsule sizes are prepared at about 1-20 microns, with an average at 4-8 microns, core content of the capsule is about 80-95%, preferably at 85-90%. The emulsifiers are used at about 1.5 to 15% based on the weight of the core materials, preferably at 3 to 9%. If the emulsifiers were used at too low a concentration, satisfactory emulsification would not be obtained, and if they were used at too high a concentration, excess agglomeration of the capsules would result. The ratio of low molecular weight sulfonate (such as NSF or DDS) to protecting colloid such as PVA is about 95:5 to 60:40, preferably at 95:5 to 80:20. If the ratio used were too high, agglomeration and free unencapsulated oil would result, and if the ratio were too low, then the capsules obtained would be more permeable and the carbonless paper coating more susceptible to discoloration as a result of processing and less stable to exposure of heat.

The capsule slurry is prepared at about 25% to 50% solid, preferably at 36% to 45%, as it is not economical to make a low solid capsule slurry, and excess agglomeration occurs when too high a percentage of solid slurry is used.

Microcapsule slurries prepared according to the present invention or according to the process taught in a conventional process are mixed with a reactive phenolic resin at about 1:2 capsule:resin active ratio. The mixed slurry is then coated on a paper substrate at about 4 g/m$^2$ coating weight to produce a self-contained sheet suitable for testing purposes. The coated sheet is then placed in a 150° C. temperature oven for 15 minutes. Any discoloration on the sheet is quantitatively measured using a conventional image analyzer, such as BNL-2 Opacimeter. A reading of 40 to 50 indicates rather porous capsules. Any reading above 75 is considered excellent.

As mentioned above, while the reason that PVA results in a more porous membrane is not totally understood, some PVA molecules may participate in capsule wall formation which in turn would reduce the overall cross-linking density of the wall. The low molecular weight sulfonates do not have this complication. The amount of protecting colloid adopted in the present invention is designed not to cause interference with cross-linking, and thus less permeable walls are formed. However, this relatively small amount of protecting colloid is large enough to prevent capsule agglomeration during the micro-encapsulation reaction and unencapsulated free oil in the final slurry.

Microcapsules prepared by the conventional method using PVA alone as emulsification agent usually will have to be washed three or four times to remove PVA from the slurry, then diluted to only about 10% solid before the slurry is spray-dried. Such capsules are not really free-flowing; the amount of PVA remaining in the capsule slurry or binded onto the surfaces of the capsule resulted in capsule-capsule interaction, clusters of microcapsules are obtained. On the other hand, if the amount of protecting colloid present in the capsules prepared according to the present invention is kept at about 1.5% or below (based on the weight of the core material), excellent free-flowing capsular powder can be easily obtained by spray-drying the capsules at a relatively high 30% solid slurry.

The present invention will be illustrated in detail in the following examples. These examples are included for illustrative purposes and should not be considered to limit the present invention.

EXAMPLES (1) Control Capsule A

A three component proprietary colorless dye composition was dissolved in 60 parts of KMC oil (diisopropylnaphthalene, commercially available from Kureha Chemicals). The dye concentration is used at 6% (by weight) of the oil. The solution was mixed with 5.93 parts of Desmodur N-100 (a polyfunctional aliphatic isocyanate, commercially available from Mobay Chemicals). The resultant oil was then emulsified into 130 parts of 3% (by weight) Vinol 523 solution. Average particle size of the emulsion was about 6 microns. 1.13 parts of DETA in 5 parts of water were then added into the emulsion. The emulsion was stirred at 50° C. under low speed mechanical stirrer for 2 hours. The capsules were then mixed with a reactive phenolic resin slurry, coated, and tested according to the procedures described above. Discoloration on the sheet has a BNL-2 reading of 50.5.

Part of the capsule slurry was washed with water 4 times, diluted to 10% solid and spray-dried. Agglomerated capsule clusters were obtained.

Control Capsule B

The same three-component dye/Desmodur N-100/KMC oil was emulsified into 130 parts of 3% Tamol L solution. Average particle size of 4.2 microns were obtained. 1.13 parts of DETA in 5 parts of water was then added into the emulsion. When the slurry was warmed to 50° C., agglomerated mass resulted. The mix was discarded.

(1A) Comparative Capsules

The general encapsulation procedure established in Example 1 is repeated in this example except that 130 parts of a 3% Tamol L/Vinol 523 at 95/5 ratio are used as emulsification agent. BNL-2 discoloration reads 90.7.

Part of the capsule slurry was diluted to 30% solid and spray-dried. Free-flowing capsular powder was obtained.

(2) In this example, polyurea microcapsules using the same formulation as established in Example 1A are prepared except NSF/PVA at various ratios are used.

| Tamol L/Vinol 523 | BNL-2 |
|---|---|
| 95/5 | 91.0 |
| 90/10 | 91.1 |
| 80/20 | 91.2 |
| 60/40 | 89.0 |
| 0/100 | 50.5 |

(3) In this example, Polyurea/epoxy (PU/E) (using Desmodur N-100, Araldite 6010, and DETA) capsules at 7/3 and 5/5 ratio were prepared using NSF/PVA at various ratios. The core materials are the same as in Example 1. The capsules were reacted at 60° C. for 1 hour. BNL-2 readings are as follows:

| Tamol L/Vinol 523 | PU/E (7/3) | PU/E (5/5) |
|---|---|---|
| 95/5 | 92.6 | 86.9 |
| 90/10 | 91.8 | 87.0 |
| 80/20 | 89.9 | 81.4 |

(4) In this example, PU/E (using Desmodur N-100, Araldite 6010, and DETA) capsules at 5/5 ratio were prepared using 130 parts of 3% NSF/various protecting colloid (PC) as emulsification agents. The core materials are the same as in Example 1. The capsules were reacted at 60° C. for 1 hour. BNL-2 readings are as follows:

| PC | Tamol L/(PC) | BNL-2 |
|---|---|---|
| PVP | 80/20 | 91.5 |
| PAAS | 80/20 | 85.5 |
| PSS | 70/30 | 86.8 |
| Scripset 520 | 80/20 | 86.8 |

(5) In this example, Tamol L/PVA at 95/5 ratio was used to prepare PU/E capsules (Desmodur N-100, Araldite 6010, DETA) at 5/5, 3/7 and 1/9 ratios. Longer reaction time is required to obtain good properties of the higher epoxy capsules. The core materials are the same.

| PU/E | Reaction Time (hr) | Tamol L/PVA | PVA alone |
|---|---|---|---|
| 5/5 | 2 | 90.3 | 42.4 |
| 3/7 | 1 | 68.6 | 37.0 |
|  | 2 | 72.7 | 37.0 |
|  | 3 | 87.9 | 34.6 |
|  | 4 | 91.8 | 37.0 |
| 1/9 | 1 | 42.0 | 27.8 |
|  | 2 | 75.6 | 28.0 |
|  | 3 | 89.6 | 27.1 |
|  | 4 | 85.1 | 26.0 |

(6) In this example, polyurea capsules are prepared by using 130 parts of 3% combined Tamol L/various protecting colloid (PC) as emulsification agent. All others are kept the same as in Example 1.

| PC | Tamol/PC | BNL-2 |
|---|---|---|
| Pig skin gelatin | 80/20 | 93.3 |
| Calf skin gelatin | 80/20 | 92.3 |
| PVP | 80/20 | 93.4 |
| Gantrez 119 | 90/10 | 91.9 |
| PSS | 90/10 | 92.3 |
| Scripset 520 | 80/20 | 91.5 |
| PAAS | 90/10 | 93.0 |

The capsules were each diluted to about 25% solid, then spray-dried. Free-flowing capsular powders were obtained.

Other comparative capsules:

Again, the general encapsulation procedure established in Example 1 is repeated except comparative emulsifiers and various isocyanates, epoxy resins, and/or amines are used. In some examples different reaction period is also incorporated.

(7A) Emulsifier: same as Control Capsule A
Isocyanate: Desmodur L-2291A 1.51 parts, MDI 1.42 parts
Epoxy resin: Araldite 6020 3.26 parts
Amine: ED 0.85 parts
Resultant BNL-2 reading: 33.1

(7B) Same as Example (7A) except that 130 parts of 3% Tamol L/Vinol 523 (at 95/5 ratio) is used as emulsifier.
Resultant BNL-2 reading: 88.1

(8A) Emulsifier: same as Control Capsule A Isocyanate: Desmodur N-100 1.51 parts, Mondur XP-744 1.51 parts
Epoxy resin: Araldite 6020 3.27 parts
Amine: ED 0.77 parts
Resultant BNL-2 reading: 42.8

(8B) Same as Example (8A) except that 130 parts of 3% Tamol L/Vinol 523 (at 95/5 ratio) is used as emulsifier.

Resultant BNL-2 reading: 79.0

(9A) Emulsifier: same as Control Capsule A

Isocyanate: Desmodur L-2291A 1.34 parts, Isonate 143L 1.426 parts

Epoxy resin: Araldite 6005 3.06 parts

Amine: HMD 1.41 parts

Resultant BNL-2 reading: 52.1

(9B) Same as Example (9A) except that 130 parts of 3% Tamol L/Vinol 523 (at 95/5 ratio) is used as emulsifier.

Resultant BNL-2 reading: 86.1

(10A) Emulsifier: same as Control Capsule A

Isocyanate: Isonate 143L 2.51 parts

Epoxy resin: Araldite 6020 3.05 parts

Amine: HMD 2.12 parts

Resultant BNL-2 reading: 68.5

(10B) Same as Example (10A) except that 130 parts of 3% Tamol L/Vinol 523 (at 95/5 ratio) are used as emulsifier.

Resultant BNL-2 reading: 75.6

(11) In this example, 130 parts of Dowfax diphenyloxide disulfonate combined with various protecting colloid (PC) are used to prepare the polyurea capsules. The core and wall materials are the same as established in Example 1. Microencapulation is conducted at 60° C. for 1 hour or room temperature for 16 hours.

| PC | Dowfax | Dowfax/PC | Temp/Time | BNL-2 |
| --- | --- | --- | --- | --- |
| none | 2A1 | — | 50° C. | * |
| none | XDS 8292.00 | — | 50° C. | * |
| Vinol 523 | 3B2 | 3% 95/5 | 60° C., 1 | 72.4 |
| Vinol 540 | 3B2 | 0.75% 90/10 | 60° C., 1 | 73.3 |
| Vinol 523 | 2A1 | 3% 90/10 | 60° C., 1 | 80.4 |
| Vinol 523 | XDS 8292.00 | 3% 90/10 | 60° C., 1 | 83.3 |
| Gelatin | 3B2 | 1.5% 90/10 | 60° C., 1 | 83.0 |
| Gelatin | 3B2 | 3% 90/10 | 60° C., 1 | 65.0 |
| PVP | 2A1 | 1.5% 90/10 | 60° C., 1 | 73.0 |
| Gantrez 119 | XDS 8292.00 | 1.5% 90/10 | 60° C., 1 | 78.8 |
| Scripset 520 | 2A1 | 1.5% 90/10 | 60° C., 1 | 67.7 |
| PAAS | XDS 8292.00 | 1.5% 90/10 | RT, 16 | 65.3 |

*Note: mix aggregated

What is claimed is:

1. A process for the production of polyurea and polyurea/epoxy microcapsules, said process comprising the steps of:
   a. mixing an oil-core material containing a colorless dye and a high boiling point carrier solvent with a polyisocyanate or a polyisocyanate-epoxy resin mixture;
   b. dispersing the resultant solution into an aqueous solution of an emulsifying mixture, said mixture comprising a first emulsifier component of a protective colloid and a second emulsifier component of a sodium salt of a napthalene sulfonic acid formaldehyde condensate or diphenyloxide disulfonate, in order to form an oil-in-water emulsion;
   c. adding a water-soluble polyamine into the emulsion;
   d. stirring the emulsion to complete the reaction.

2. A process as claimed in claim 1, wherein the ratio of said first emulsifier component to the second emulsifier component is from 40:60 to 5:95.

3. A process as claimed in claim 1, wherein after the polyamine addition (c), the emulsion is heated to a range of 25° C. to 70° C.

4. A process as claimed in claim 3, wherein said emulsion is heated for 1 to 24 hours.

* * * * *